Dec. 11, 1945.    A. M. MacFARLAND    2,390,890
METHOD OF SOLDERING
Filed Feb. 4, 1943
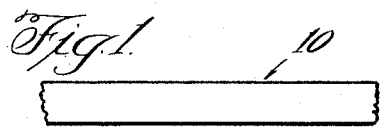
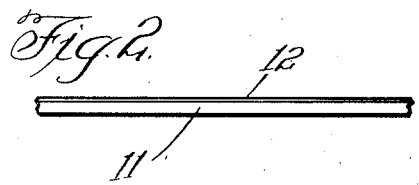
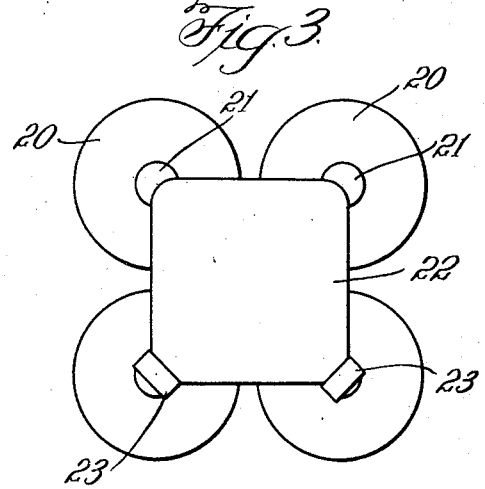
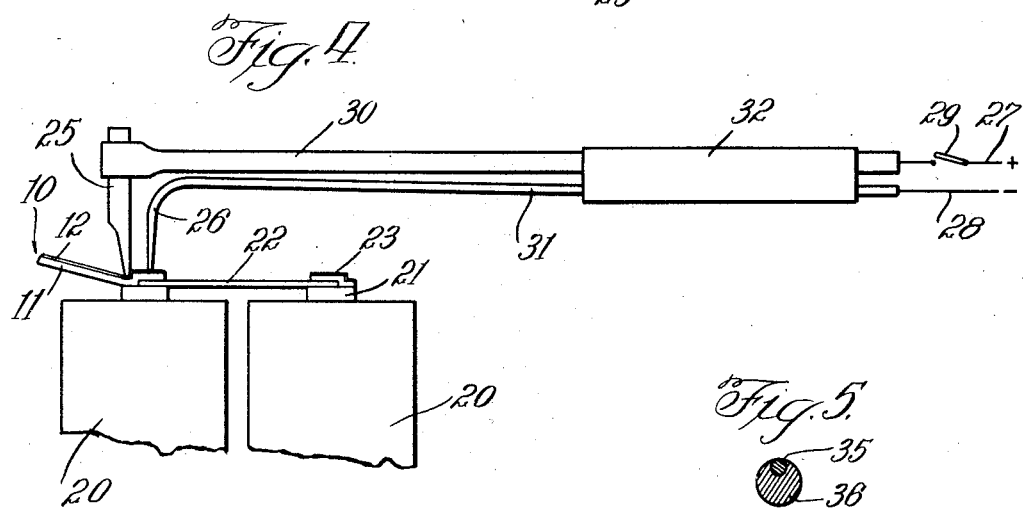
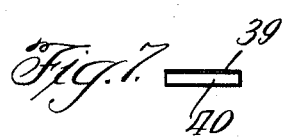
Inventor:
Allison M. MacFarland
By- Tesch and Darbo
Att'ys.

Patented Dec. 11, 1945

2,390,890

UNITED STATES PATENT OFFICE 2,390,890

METHOD OF SOLDERING

Allison M. MacFarland, Freeport, Ill., assignor to Burgess Battery Company, Freeport, Ill., a corporation of Delaware Application February 4, 1943, Serial No. 474,672

1 Claim. (Cl. 113—112)

This invention relates to an improved method of forming a soldered joint. It is the object of the invention to provide a soldering member which provides uniformly satisfactory soldering results with solders of varying composition, and which makes it possible to employ solders and soldering compositions which heretofore could not be used or whose use was attended with difficulty. It is a further object of the invention to provide a soldering member to which the heat for causing fusion can be applied more quickly and with greater facility than heretofore.

Briefly, the invention consists in providing a composite soldering member composed of metallic solder and a reenforcing backing, the backing being of metallic composition and having a melting point substantially higher than that of the solder.

In the soldering art, it has been the practice to employ solders composed of certain metals or of mixtures, or alloys, of such metals. The low melting point solders, composed of metals such as lead, tin, antimony and bismuth are called soft solders, while those having higher melting points and composed of metals such as copper, cadmium, zinc manganese, nickel, silver and gold, are called hard solders.

When heat is applied to solder for the soldering operation, it is usually applied rapidly at a localized spot, and when some of the solders referred to heretofore are heated in this manner, they spatter and separate into small discrete balls or drops, and do not flow smoothly upon the surfaces of the parts to be joined. This may be due to the rapid rise in temperature and fusing of the solder at a local spot while the adjacent portions remain cooler and in the solid condition. Lead is an example of a metal which is subject to this difficulty.

The soldering member of the present invention is free of any such objection, and the solder in all cases flows smoothly and uniformly. The heat may be applied very rapidly, with the result that soldering operations may be speeded up. Contact resistance heating may be employed, that is, an operation in which electric current is passed through the soldering member and an electrode which is in contact with the soldering member under such conditions that high resistance is present at the point of contact. Very rapid heating occurs at that point under such conditions.

In the drawing,

Figs. 1 and 2 are top and side views, respectively, of a section of one form of the soldering member of this invention;

Fig. 3 is a plan view showing several soldered joints made in accordance with this invention;

Fig. 4 is a side view showing one of the soldered joints of Fig. 3 in the process of being made;

Fig. 5 is a cross-sectional view of a different form of the soldering member; and Figs. 6 and 7 are plan and side views, respectively, of a further form of the soldering member.

The composite soldering member of this invention preferably is in the general shape of a sheet, for example, in the form of an elongated ribbon 10, a section of which is shown in Figs. 1 and 2. The member consists of two layers which are joined together, one layer being the main body 11 composed of the metallic solder, and the other being the reinforcing backing 12.

The solder may be composed of any of the metals or alloys of which the soft solders and hard solders are composed, and the term "solder" when used herein in the specification and claim, will designate such metal or alloy. These solders have melting points ranging from approximately 60° C., for the lowest melting point soft solders, to 1083° C., the melting point of copper. The lower melting point solders are preferred. The solder should have a melting point lower than that of the parts to be united, as is understood.

The backing 12 may be composed of any metal or alloy which has a melting point substantially higher than that of the solder 11. For example, with a solder composed of lead, having a melting point of 327° C., satisfactory results are obtained with a backing composed of copper (melting point 1083° C.), aluminum (melting point 660° C.) or iron (melting point 1535° C.). It is understood that impurities may be present in these metals and the melting points may vary from those given, as a result. Soft steel functions in substantially the same manner as iron. The difference between the melting point of the solder and that of the backing may vary considerably. Satisfactory results are obtained if the difference amounts to 300 degrees centigrade. The backing may be imperforate, as shown in Figs. 1 and 2 and it may be foraminous. A fine mesh screen may be used.

The size and thickness of the soldering member and the relative thickness of the solder and the backing may be varied as desired. A relatively thin backing is sufficient to provide the desired reenforcing properties, and its thickness may be only a fraction of that of the solder. Satisfactory results have been obtained with a ribbon 0.125 inch wide in which the solder is 0.030 inch thick and the backing is from 0.005 inch to 0.010 inch thick. For ordinary soldering operations a solder ribbon thickness ranging from .015 inch to 0.050 inch, and a backing thickness ranging from .0015 inch to .020 inch are satisfactory.

The soldering member may be formed by fashioning the solder into the form of a sheet of the desired thickness, and applying to one surface thereof a thin layer of the backing material. This may be done by spraying the backing material in the molten condition against the surface of the solder according to hot metal spraying procedure which is well known. The backing may also be applied to the solder sheet by an electroplating operation. The solder may be applied to the backing element by drawing the latter through a bath of the molten solder. For this method, the surface of the backing element may be roughened or corrugated, or a foraminous element may be used, in which case more solder will adhere to it. In this case, also, the backing element has a coating of solder on both surfaces. In another method, the two elements may be formed separately and brought together and heated sufficiently to cause the solder to fuse slightly and become joined to the backing.

In Fig. 3 an illustration is given of an application of the soldering member of the present invention for electrically connecting together the positive terminals of a plurality of dry cells. The dry cells 20 are grouped in the desired arrangement. Each cell has a carbon electrode which is provided with the usual metal cap 21, which may be of brass or other suitable metal. A plate 22 of metal having suitable electrical conducting properties is arranged so that the corner portions are in engagement with the terminals 21 and partially overlie the same. Two of the terminals are shown as having been connected to the conducting plate by the soldering members 23.

Fig. 4 illustrates the manner in which the soldered connection is effected. The end portion of the elongated ribbon-form soldering member 10 is disposed upon the corner of the conducting plate 22 in such manner that portions thereof overlie the conducting plate and the terminal 21. Prior to this operation, the surfaces of the parts to be joined may be treated with a suitable soldering flux in accordance with known practice. The member is placed so that the solder layer 11 is in contact with the said parts and the backing 12 is exposed. A pair of spaced-apart electrodes 25 and 26 are then brought into contact with the backing 12. Electrode 25 is composed of carbon and electrode 26 is composed of a metal which has relatively low electrical resistance. The electrodes are connected to a source of electrical energy (not shown) by conductors 27 and 28. The circuit is completed through the portion of the soldering member between the electrodes by closing switch 29 in conductor 27. A high contact resistance exists between carbon electrode 25 and the soldering member, and heat is generated rapidly at this point whereby the member is heated and the solder becomes molten and flows upon the surfaces of conducting plate 22 and terminal 21. The backing remains in solid condition, at least for a portion of the heating time, and affords the protection essential to prevent spattering of the solder. The backing may eventually become molten or broken, but it, nevertheless, successfully performs the protecting function. It has been found that the protection is required primarily during the early portion of the heating, while the solder is relatively cold. After the body of the solder has reached an elevated temperature, the local application of further heat will not cause spattering in the absence of the backing element. While the heat is being applied, and while the electrode 25 is being held firmly in position, the extending portion of the ribbon is grasped by the hand and pulled or jerked with sufficient force to cause the ribbon to come apart at the point where it emerges from beneath electrode 25. The backing element is made small enough in cross section that it separates with sufficient ease for convenient operation. Switch 29 is then opened, whereby the heating effect is discontinued, and the electrodes are raised out of contact with the soldering member. The solder solidifies and forms a firm joint between the conducting plate 22 and the terminal 21. In the joint, the amount, in terms of volume, of solder present is substantially greater than that of the backing material.

To facilitate soldering operations, the electrodes 25 and 26 are incorporated in a readily manipulable tool. The carbon electrode 25 is mounted upon an arm 30 of electrically conductive material. Metal electrode 26 is preferably composed of a resilient material, such as spring bronze, and is curved so as to form a shank portion 31 extending parallel to arm 30. Both of the electrodes are mounted in and spaced apart by a handle member 32 of electrically non-conductive material. The end of electrode 26 normally extends downwardly (in the position shown in Fig. 4) a short distance beyond the end of carbon electrode 25. This arrangement insures that firm contact is made at both electrodes.

While the composite soldering member is preferably ribbon-shaped, it may take shapes other than this. It may be substantially square in cross section. It may also be round in cross section, as shown in Fig. 5, in which case the backing 35 may be a wire partially or completely embedded in a larger wire 36 composed of the solder. The cross-sectional area of the solder is caused to be greater than that of the backing. The backing need not completely cover the surface of the solder to which the heat is applied. As is explained heretofore, the ribbon-form backing element may have a coating of solder on both sides. The presence of the backing serves to prevent spattering even though the heat is applied directly to the solder. The nature of the action is not clearly understood. It may be that the backing member, being in intimate contact with the solder, conducts heat away from the spot at which it is being applied with sufficient effectiveness to prevent spattering. It may be that the mere physical presence of the backing causes the solder to respond differently to the heat. The fact remains that with the composite soldering member, very rapid formation of soldered joints is possible, and solders may be used which would otherwise spatter in the early stages of the fusing operation.

The composite soldering member need not be in elongated form. It may be in the form of a disc of a size adapted to form a single joint, as shown in Figs. 6 and 7. The disc-shaped member 38 is composed of a thick layer 40 of solder and a relatively thin backing layer 39.

As stated heretofore, the backing 12 remains in solid condition during at least a portion of the time while the solder is being heated to the fused condition, and in so doing serves to prevent the spattering which might otherwise take place. The intensity of heating may be controlled in such manner that the backing element remains solid throughout the operation, and remains as a reenforcement of the solder in the finished joint.

It is possible to carry out the soldering operation with a soldering member in which the solder and the backing are not joined together but are separate. In such case, positioning of both the solder ribbon and the backing ribbon is required, and a unitary composite soldering member is preferred.

While a special tool has been described above for use in carrying out the soldering operation, an ordinary soldering iron may be used as well. With the soldering member shown in Figs. 1 and 2, the heated soldering iron is applied to the exposed backing 12, and the heat is conducted through the backing to the solder 11.

The invention has been described in connection with the soldering together of separate parts, or articles, but it is adapted as well for the mending of cracks or breaks of a single article, or the filling of holes.

I claim:

The method of soldering which comprises placing an end portion of an elongated composite soldering member against the parts to be soldered, said soldering member being composed of an element of metallic solder and a metallic backing element in conjoint relation with each other, said backing element having a cross-sectional area substantially less and a melting point substantially higher than that of said solder, arranging said soldering member with the solder element in contact with said parts, heating said end portion of said elongated soldering member to cause fusion of said solder, holding said heated end portion against said parts and pulling on a different portion of said soldering member to cause said end portion to separate from the remainder of said soldering member, and discontinuing said heating.

ALLISON M. MacFARLAND.